United States Patent
Denious et al.

(10) Patent No.: US 6,622,003 B1
(45) Date of Patent: Sep. 16, 2003

(54) METHOD FOR DEVELOPING OR PROVIDING AN ELECTRONIC COURSE

(75) Inventors: Elizabeth Denious, Evanston, IL (US); Thomas M. Duffy, Bloomington, IN (US); Craig W. Friedman, Deerfield, IL (US); Richard Earle Osgood, Wilmette, IL (US); John D. White, Park Ridge, IL (US)

(73) Assignee: UNext.com LLC, Deerfield, IL (US)

(*) Notice: Subject to any disclaimer, the term of this patent is extended or adjusted under 35 U.S.C. 154(b) by 0 days.

(21) Appl. No.: 09/638,270

(22) Filed: Aug. 14, 2000

(51) Int. Cl.$^7$ .............................................. G09B 11/00
(52) U.S. Cl. .................... 434/350; 434/307 R; 434/365
(58) Field of Search ................................. 434/350, 322, 434/236, 118, 238, 362, 365

(56) References Cited

U.S. PATENT DOCUMENTS

| | | | |
|---|---|---|---|
| 4,772,206 A | | 9/1988 | Kerr et al. |
| 4,820,167 A | | 4/1989 | Nobles et al. |
| 4,846,693 A | * | 7/1989 | Baer ............................ 434/308 |
| 4,877,404 A | | 10/1989 | Warren et al. |
| 5,002,491 A | | 3/1991 | Abrahamson et al. |
| 5,267,865 A | | 12/1993 | Lee et al. |
| 5,310,349 A | | 5/1994 | Daniels et al. |
| 5,393,071 A | * | 2/1995 | Best ............................ 273/434 |
| 5,395,243 A | | 3/1995 | Lubin et al. |
| 5,441,415 A | | 8/1995 | Lee et al. |
| 5,597,312 A | | 1/1997 | Bloom et al. |
| 5,727,950 A | | 3/1998 | Cook et al. |

(List continued on next page.)

FOREIGN PATENT DOCUMENTS

WO    WO 98/22864    5/1998

OTHER PUBLICATIONS

Yahoo! Internet Life Magazine Names Dakota State University the #12 Most Wired College in the Country, [online] [retrieved on Nov. 23, 1998] retrieved from the Internet: <URL: http:/www.dsu.edu/yahoo.htm.

DSU Open Internet Courses, [online] [retrieved on Nov. 23, 1998] retrieved from the Internet: <URL: http:/www.courses.dsu.edu/disted/courses.htm.

Menu Pages for "The Commons", [online] [retrieved on Nov. 5, 1998] retrieved from the Internet: <URL: http://www.wcc-eun.com/wln/commons/index.html.

Home Pages For University Without Walls At the University of Massachusetts Amherst, [online] [retrieved on Nov. 5, 1998] retrieved from the Internet: <URL: http://www.klaat-u.oit.umass.edu/uww/uww_home.html.

Slide Show of Information Relating To Online Educational Programs, [online] [retrieved on Nov. 5, 1998] retrieved from the Internet: <URL: http://www.howardcc.edu/hcc/facpres/sld003.htm (Slides 3–13 of 14).

ADEC and Virtual Universities "Toward Common Vision and Action", [online] [retrieved on Nov. 5, 1998] retrieved from the Internet: <URL: http://www.adec.edu/vuniv/adec/place1.html.

(List continued on next page.)

*Primary Examiner*—Joe H. Cheng
*Assistant Examiner*—Kathleen Christman
(74) *Attorney, Agent, or Firm*—Brinks Hofer Gilson & Lione

(57) ABSTRACT

A method for developing an electronic course may include describing an illustrative scenario that presents a problem for a student of an electronically deliverable course. At least one possible role assignment for a corresponding student of the course may be defined based on the illustrative scenario. A task may be provided for the student based on the role assignment and the scenario. A guidance system may be established which is accessible to the students over the electronic communications network. The guidance system provides guidance for solving the task or problem associated with the scenario.

25 Claims, 7 Drawing Sheets

U.S. PATENT DOCUMENTS

| | | | |
|---|---|---|---|
| 5,788,508 A | | 8/1998 | Lee et al. |
| 5,810,605 A | | 9/1998 | Siefert |
| 5,813,863 A | * | 9/1998 | Sloane et al. ............... 434/236 |
| 5,823,788 A | | 10/1998 | Lemelson et al. |
| 5,909,589 A | | 6/1999 | Parker et al. |
| 5,957,699 A | | 9/1999 | Peterson et al. |
| 5,974,446 A | | 10/1999 | Sonnenreich et al. |
| 5,987,443 A | | 11/1999 | Nichols et al. |
| 6,014,134 A | | 1/2000 | Bell et al. |
| 6,024,577 A | | 2/2000 | Wadahama et al. |
| 6,029,043 A | | 2/2000 | Ho et al. |
| 6,039,575 A | | 3/2000 | L'Allier et al. |
| 6,064,856 A | | 5/2000 | Lee et al. |
| 6,064,865 A | | 5/2000 | Kuo et al. |
| 6,106,399 A | * | 8/2000 | Baker et al. ................... 463/42 |
| 6,210,272 B1 | * | 4/2001 | Brown .......................... 463/1 |
| 6,296,487 B1 | * | 10/2001 | Lotecka ...................... 434/118 |
| 6,301,462 B1 | * | 10/2001 | Freeman et al. ............ 434/350 |
| 6,341,960 B1 | * | 1/2002 | Frasson et al. ............. 434/118 |
| 6,347,333 B2 | * | 2/2002 | Eisendrath et al. ......... 434/350 |
| 6,358,053 B1 | * | 3/2002 | Rosenfield et al. ......... 434/156 |

OTHER PUBLICATIONS

SINEwave The COB Virtual Campus (Distance Learning at the College of Business at UCB), [online] [retrieved on Nov. 5, 1998] retrieved from the Internet: <URL: http://www.colorado.edu/infs/jcb/sinewave/service/virtualcampus/.

Welcome to the California Virtual University, [online] [retrieved on Nov. 5, 1998] retrieved from the Internet: <URL: http://www.california.edu/about.html.

Article Discussing Design of Online University: Johnstone/Jones: Western Governors University, [online] [retrieved on Nov. 5, 1998] retrieved from the Internet: <URL: http://www.ttu.edu/lists/acw-1/9707/0078.html.

Web Pages Relating To Western Governors University Website at [online] [retrieved on Nov. 5, 1998] retrieved from the Internet: <URL: http://www.wgu.edu/wgu/academics/dist_learning/html.

Website for the University of Phoenix Online Campus, [online] [retrieved on Nov. 5, 1998] retrieved from the Internet: <URL: http://www.uophx.edu/online/on1_camp.htm.

Printout of Website for: The Electronic University Network, [online] [retrieved on Nov. 5, 1998] retrieved from the Internet: <URL: http://www.wcc-eun.com/eun.html.

Website Entitled Brevard Community College Online . . . Telecommute on the Information Super Highway with BCC, [online] [retrieved on Nov. 5, 1998] retrieved from the Internet: <URL: http://brevard.cc.fl.us/online/campus/.

Web Page Entitled "Welcome to . . . Apollo Group, Inc.", [online] [retrieved on Nov. 5, 1998] retrieved from the Internet: <URL: http://www.apollogrp.com/.

Micron University Home Page Entitled "Micron U", [online] [retrieved on Nov. 4, 1998] retrieved from the Internet: <URL: http://programs.micronpc.com/micro . . . OL1RTR4UWVPBGP3&where=home&why=gen.

Meyrowitz, "Intermedia: The Architecture and Construction of an Object–Oriented Hypermedia System and Applications Framework", OOPSLA '86 Proceedings published Sep. 1986.

Bonar et al., "An Object–Oriented Architecture For Intelligent Tutoring Systems", OOPSLA '86 Proceedings published Sep. 1986.

Weyer et al., "A Prototype Electronic Encyclopedia", ACM Transactions on Office Information Systems, vol. 3, No. 1, Jan. 1985, pp. 63–88.

Article in Byte Magazine entitled "The Difference in Higher Education" dated Feb. 1987.

Morris et al., "Andrew: A Distributed Personal Computing Environment", Communications of the ACM, Mar. 1986, vol. 29, No. 3.

Wiseman, "Teaching (Virtually) Teaching", [online] [retrieved on Nov. 23, 1998] retrieved from the Internet: <URL: http://gsula.gsu.edu/faculty/lawppw/vtt/virtual.html.

Patent Abstracts of Japan, English Abstract for Japanese Application Publication No. 08235089 "Education Support System" Published Sep. 13. 1996.

Patent Abstracts of Japan, English Abstract for Japanese Application Publication No. 10040199 "Education Support System" Published Feb. 13, 1998.

Richard E. Osgood, *The Conceptual Indexing of Conversational Hypertext*, Jun. 1994 (a doctoral dissertation that was or may be accessible to the public via the Northwestern University Library, Evanston, Illinois).

* cited by examiner

METHOD FOR DEVELOPING OR PROVIDING AN ELECTRONIC COURSE

FIELD OF THE INVENTION

This invention relates to a method for developing or providing an electronic course for instruction of students via an electronic communications network.

BACKGROUND OF THE INVENTION

Electronic courses may be provided to students via an electronic communications network, such as the Internet or a public switched telephone network. Electronic courses offer the advantage of reducing or eliminating the cost of infrastructure (e.g., maintaining buildings and real estate) that is necessary to support a traditional school or university. Many obstacles can impede the effective delivery of an electronic course, including a protracted duration of course development, the failure to maintain student interest, the lack of student interaction, and comprehension difficulties associated with an electronic medium.

The cost of developing an electronic course depends upon the duration of the course development process and the amount of resources (e.g., people) assigned. During the course development process, experts, professors and other scholars may act as consultants. If the course development process exceeds a critical duration, consultant fees may curtail the economic viability of the electronic course. Further, the electronic course may not be available to students until after the development process, which may have a negative impact on income for a virtual school. Thus, a need exists for developing an electronic course in a limited amount of time that adequately meets economic constraints.

A traditional classroom offers students and an instructor a forum for exchanging ideas. During the delivery of an electronic course, a lack of interaction or collaboration with other students may form an obstacle to learning. Thus, a need exists for supporting interaction, collaboration and exchange among students and the instructor in the virtual classroom or in the delivery of an electronic course.

In the context of preparing a traditional scholastic course, a professor may work in conjunction with a editor to produce a textbook. The textbook may contain errors, ambiguities or examples that are not tailored to the students because of the professor's high level of expertise, among other factors. A publisher may allocate limited editing resources to the textbook. Any deficiency in the allocation of editing resources contributes to errors and inconsistencies in the textbook. Thus, a need exists to reduce the cost of course development and to enhance the integrity of an electronic course in comparison to traditional courses based on textbooks and physical classrooms.

BRIEF SUMMARY OF THE INVENTION

In accordance with a first aspect of the invention, a method for providing or developing an electronic course facilitates a reduction of the length of course development time, enhanced student interactions with others, and electronic course materials with integrity equal to or superior to that of traditional textbooks. The method of the invention includes describing an illustrative scenario for an electronically deliverable course. At least one possible role assignment for a corresponding student of the course is defined based on the illustrative scenario. A task or problem is provided for the student based on the role assignment and the scenario. A guidance system is established which is accessible to the student over the electronic communications network. The guidance system provides guidance to the student for solving the task or the problem.

In accordance with second aspect of the invention, a method for developing an electronic course facilitates a reduction in time for development of the course. The method organizes an electronically deliverable course into a group of modules of different subject matters related to a common topic of the course. At least two of the modules are simultaneously developed for the course. A test subject, who is representative of a student of the course, reviews an electronic presentation of at least one of the developed modules prior to placing the course on the electronic communications network for access to students of the course.

In accordance with a third aspect of the invention, a method for developing an electronic course integrates strategic learning elements into the electronic course to enhance the learning environment of students. A scope of subject matter is defined for at least one course. An organizational structure is established for the at least one course based on the defined scope. A strategic learning element is associated with the organizational structure. The strategic learning element is expressible as reference data. The organizational structure and the strategic learning element are presented to students in an interactive manner consistent with an instruction-student interaction model.

In accordance with a fourth aspect of the invention, a method for developing an electronic course assembles elements in a predefined order to minimize or reduce the development time for developing a course. Elements of a course are designed. A greater-resource element is built prior to a lesser-resource element of the course. The greater-resource element and the lesser-resource element are assembled into a course component of the course. The course component of the electronic course is tested and adapted for association with a storage device of a central data processor.

DETAILED DESCRIPTION OF THE PERFERRED EMBODIMENTS

Figure 1:
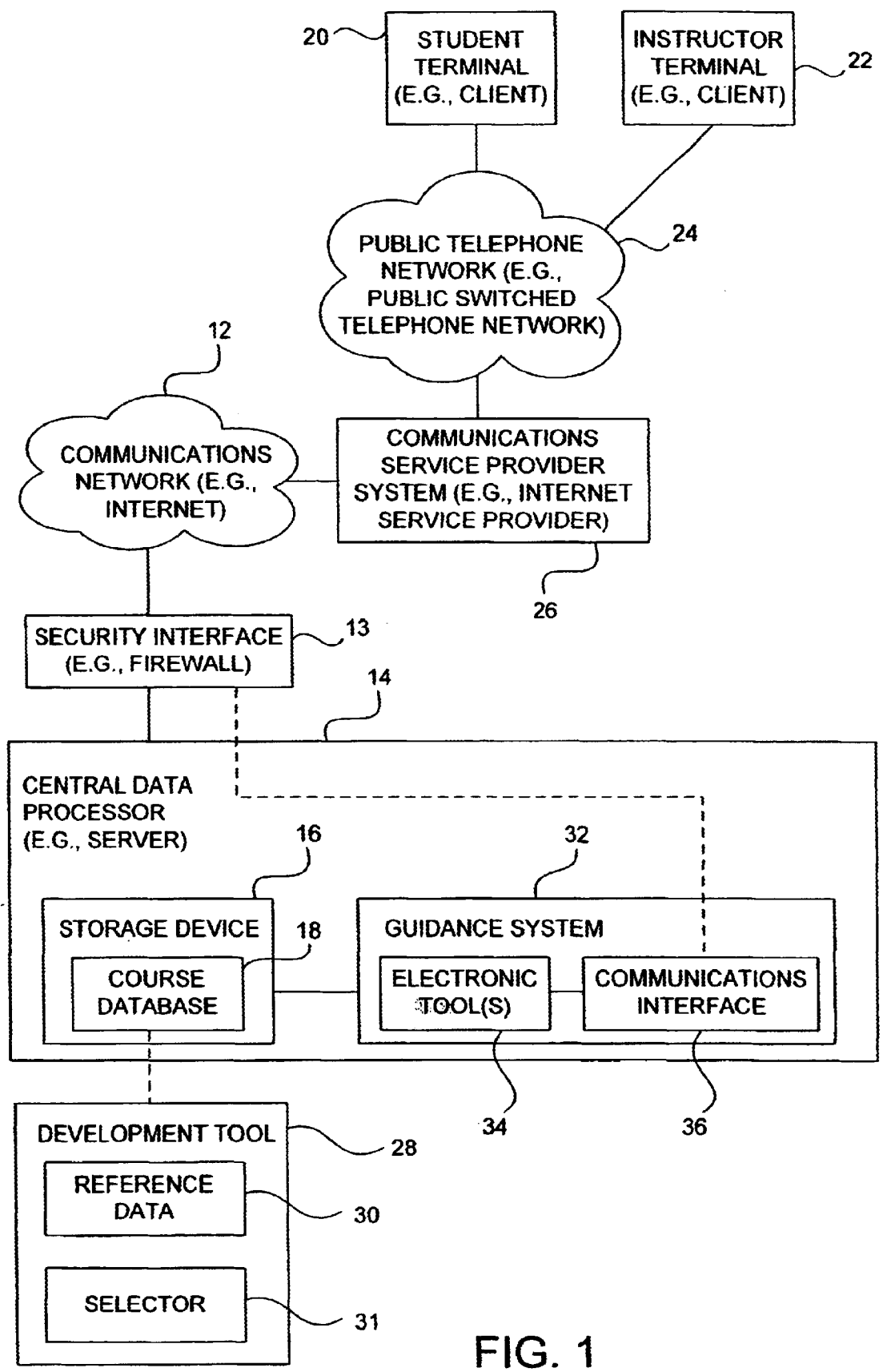
FIG. 1 is a block diagram of an illustrative system for developing or providing an electronic course in accordance with the invention.

In accordance with the invention, FIG. 1 shows an illustrative system for developing or providing an electronic course. As used herein, providing an electronic course may include one or more of the following activities: creating an electronic course, developing an electronic course, testing an electronic course, delivering an electronic course to one or more students, and presenting an electronic course to one or more students. A development tool 28 may comprise a computer programmed to provide an organizational structure or framework for developing an electronic course. A developer may use the development tool 28 to generate and/or organize reference data 30 for an electronic course. Reference data 30 refers to presentation data, audio data, visual data, multimedia data, textual data, graphical data, and any other data that may form an element or support a feature of an electronic course. The development tool 28 may allow a developer to select different reference data 30 for affiliation with the corresponding scenarios. Scenarios are factual or hypothetical case studies which may be used in a problem-based learning environment.

As shown in FIG. 1, at least one student terminal 20 and at least one instructor terminal 22 may access a communications network 12 (e.g., Internet) via a public telephone network 24 (e.g., public switched telephone network) and a communications service provider system 26 (e.g., Internet service provider (ISP) system). A student terminal 20 may comprise a client or a personal computer which is coupled to the communications network 12 for communication with the central data processor 14. The central data processor 14 may comprise a server that is capable of communicating with one or more student terminals 20. A security interface 13 (e.g., firewall) is coupled between the communications network 12 and the central data processor 14 to authenticate authorized students subscribing to electronic courses. The security interface 13 prevents unauthorized users from accessing the course database 18.

The central data processor 14 includes a guidance system 32 and a storage device 16 for storing a course database 18. The guidance system 32 is physically or logically coupled to the storage device 16. The guidance system 32 may include an electronic tool 34 and a communications interface 36.

A student terminal 20 communicates to a central data processor 14 through the communications network 12. One or more electronic courses are organized in a course database 18 and stored in a storage device 16 of the central data processor 14. The course database 18 includes reference data 30 for supporting the features of the electronic course. The reference data 30 is compatible with a software program controlled by commands issued from a student terminal 20, an instructor terminal 22, or both. Upon a request from a student terminal 20, the central data processor 14 may retrieve reference data 30 or course components from the course database 18 for transmission to the student. Similarly, upon request from an instructor terminal 22, the central data processor 14 may retrieve course components from the course database 18 for transmission to one or more selected students. In one embodiment, the reference data 30 is suitable for communications over a communications network 12 to support a learning environment for students.

The student terminal 20 may request the transmission of an electronic tool 34 or tool-related data associated with a course component. The guidance system 32 may support one or more of the following actions: (1) the transfer of an electronic tool 34, tool-related data, or other helpful data to one or more student terminals 20, (2) the exchange of information between student terminals 20 with or without instructor surveillance, and (3) the exchange of information between one or more student terminals 20 and an instructor terminal 22.

The student terminal 20 and the instructor terminal 22 may be remotely located with respect to one another and the central data processor 14. Although the student terminal 20 and the instructor terminal 22 access the central data processor 14 over the same public telephone network 24 as shown in FIG. 1, in an alternate embodiment the instructor terminal 22 and the student terminal 20 may access the central data processor 14 over different public telephone networks 24 (e.g., in different countries) or over any other type of communications transmission systems (e.g., coaxial cable, microwave links, or fiber optic cables).

Figure 2:
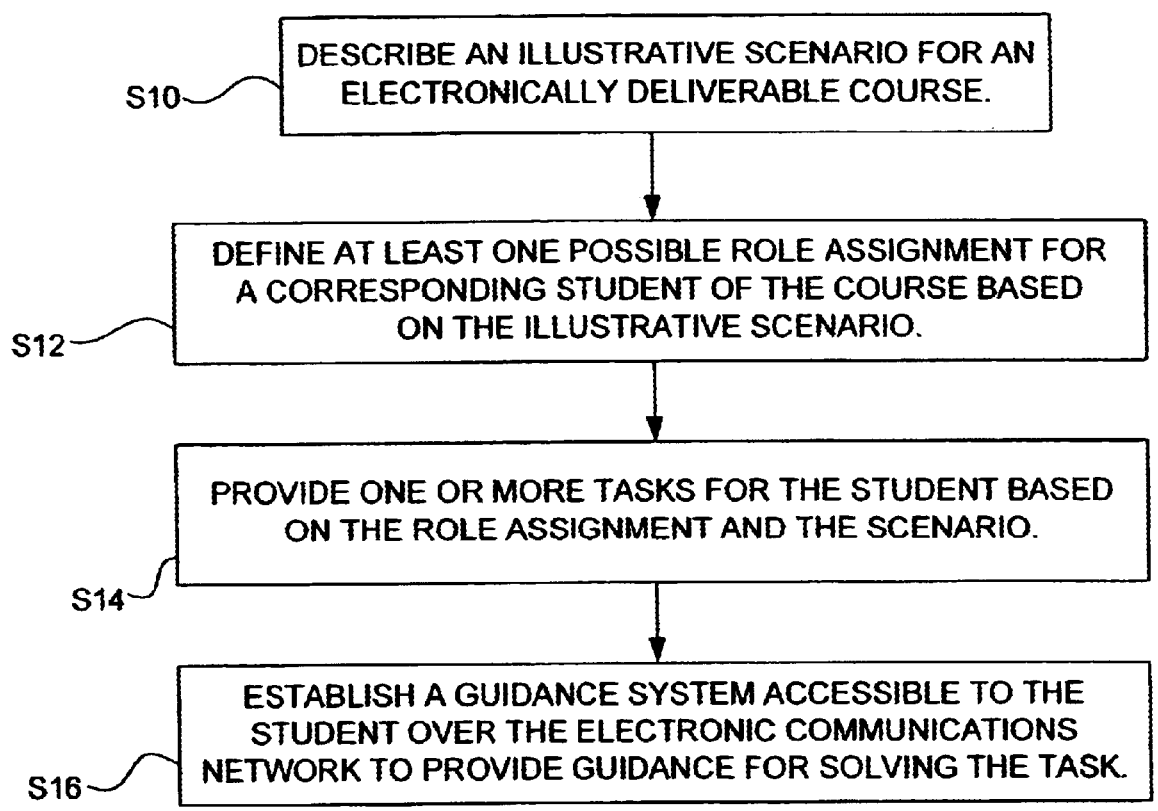
FIG. 2 is a flow diagram of one example of a method for developing an electronic course in accordance with the invention.
Figure 3:
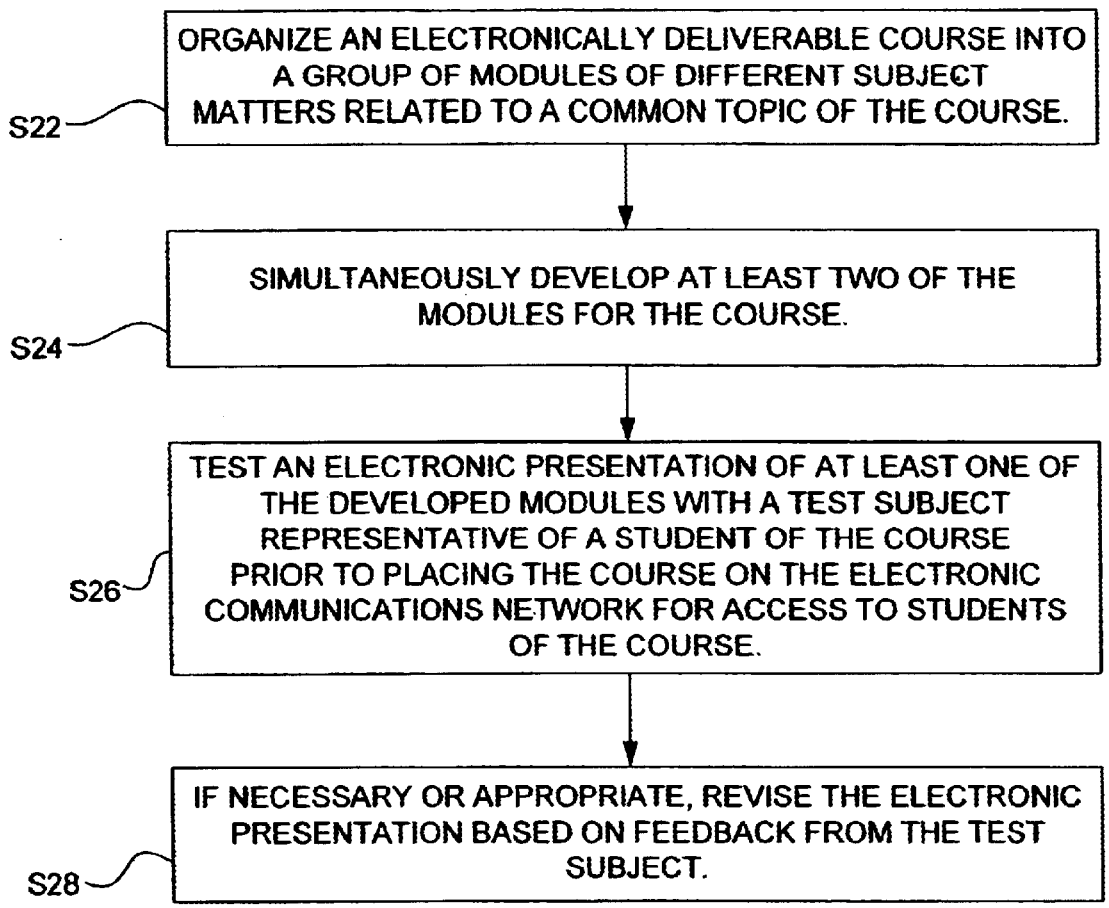
FIG. 3 is a flow diagram of another example of a method for developing an electronic course in accordance with the invention.

In accordance with the invention, an electronic course may be established in a modular fashion beginning with the procedure of FIG. 2 or FIG. 3. FIG. 2 illustrates an example of a flow diagram for a method of developing an electronically deliverable course. Starting in step S10, the developer describes an illustrative scenario for an electronically deliverable course. An electronically deliverable course refers to any course or other instruction (e.g., scholastic instruction) that may be communicated over an electronic communications network 12, such as the Internet. The electronically deliverable course preferably has a software/Internet component and a dynamic instructional component. The software/Internet component provides a logical framework and functionality of the electronic course. The dynamic instructional component includes the guidance and oversight of at least one instructor (e.g., a teaching assistant, an expert, or a professor) and the collaboration-supporting dynamics of the live discussion tool. The dynamic instructional component provides additional intangible benefits of human interaction in the electronically deliverable course.

An electronic communications network 12 may be used to facilitate communications between student terminals 20 and the central data processor 14, to facilitate communications between student terminals 20, to facilitate communications between at least one student terminal 20 and at least one instructor terminal 22, or any combination of the foregoing communications. The electronic communications network 12 may support packetized traffic (i.e., virtual interconnections), circuit switched traffic (i.e., actual interconnections), or both.

The developer stores an illustrative scenario in the course database 18 in the storage device 16 associated with the central data processor 14. The illustrative scenario may inferentially or expressly present a problem or issue for consideration by the student. An illustrative scenario represents a set of facts which may be based on a hypothetical example, fictitious events, current news, or actual case studies, among other possibilities. A course developer preferably selects the illustrative scenario to be relevant to the course and to provide a pragmatic education, which may be readily transferred to real life events. The illustrative scenario may be identified by a scenario identifier. One or more illustrative scenarios are associated with a corresponding electronically deliverable course. Further, if a course is divided into modules, illustrative scenarios may be associated with corresponding modules of the course.

The course may be identified by a course identifier. The module may be identified by a module identifier. Accordingly, the course identifier, the module identifier, and the scenario identifier may represent fields in the course database 18. The course database 18 may comprise a lookup table along with illustrative scenario data or a reference to the illustrative scenario data stored in another location. The student terminal 20 may provide the course identifier, the module identifier, and the scenario identifier in a request requesting the presentation of a particular scenario. The scenario data is reference data 30 that contains the information required to present a scenario to the student terminal 20.

The transmission of the course identifier, the module identifier, and the scenario identifier are automatically invoked in a manner that is generally imperceptible to a student using a student terminal 20.

In step S12, following step S10, the course developer defines at least one possible role assignment for a corresponding student of the course based on the illustrative scenario. The role assignment may be selected to engage the interest of the student in the illustrative scenario. The role assignment may make the student an active participant in the illustrative scenario and an active participant in the learning process, rather than a passive observer, to garner the interest of students. Accordingly, the definition of the role assignment for corresponding students may facilitate reduced attrition rates for course enrollment and a continuing relationship between the student and the provider of electronically deliverable course.

In step S14, the developer provides a task for the student based on the role assignment and the scenario. The task represents a work assignment for the student, where the work assignment is relevant to at least a portion of the problem, affiliated with the scenario described in step S10. Although the task is preferably commensurate in scope with a portion of the problem, in an alternate embodiment the task may be commensurate with the entire scope of the problem. The illustrative scenario may have multiple role assignments. The students may be permitted to select from a list of possible role assignments or the instructor or the electronically deliverable course itself may assign the role assignment for each student.

The role assignment preferably has a role assignment identifier and a task preferably has a task identifier. The developer stores a task identifier for the corresponding role identifier and the scenario identifier in the course database 18. The task identifier and the role identifier may comprise fields in the course database 18. The task identifier may provide a reference to a storage location for the task data which may be retrieved upon a request from a student terminal 20. Task data may be reference data 30 that expresses a presentation of a problem or a question for a student. The task data is preferably placed in an appropriate format for transmission to or presentation on the student terminal 20. A student is prompted or expected to provide an answer to the task. The student preferably sends the answer as an electronically transmitted solution (e.g., e-mail) to the course provider or the instructor terminal 22, although other answer formats (e.g., mail or facsimile) may be acceptable and fall within the scope of the invention. Prior to the submission of an answer or after the submission of an answer, a student may seek guidance in understanding or responding to the task.

In step S16 the course developer establishes a guidance system 32 which is accessible to the student terminal 20 over at the electronic communications network 12 to provide guidance for solving the task or the problem associated with the scenario. The guidance system 32 represents one or more of the following: an electronic tool 34 for determining an intermediate result or a precursor to the solution of a task or problem, a presentation on a topic related to the task, a specific direction on solving the task or problem, a hint for solving the task or problem, a communications link to at least one other student, and a communications link to an instructor of the course. A hint is a suggestion or a tip that assists a student in solving a task or problem. The guidance system 32 may comprise any procedure or system for facilitating interaction among students, collaboration among students, and interaction between one or more students and an instructor of the course.

The guidance system 32 may be established in accordance with several alternative techniques. In accordance with a first technique for establishing a guidance system 32, the guidance system 32 comprises providing a list of one or more electronic tools 34 to a student. The student selects one or more of the electronic tools 34 associated with a corresponding scenario, a corresponding problem, a corresponding task, or any combination of the foregoing items. One electronic tool may represent a calculator for determining an intermediate result or precursor to the solution of the task.

In accordance with a second technique, the guidance system 32 tailors the level of guidance provided to the student terminal 20 based on an individually assigned level of a student or a general level of group of students. For example, the assigned level of the group of students may be based on previous feedback from an instructor during a current course, a previous course, a pretest, or otherwise.

In accordance with a third technique, a guidance system 32 includes establishing an electronic library of presentations associated with a corresponding task. The electronic library is accessible to one or more students via the electronic communications network 12. The presentations may include one or more of the following: an audio presentation, a visual presentation, a multimedia presentation, or any suitable presentation represented as digital or analog data.

In accordance with a fourth technique, a guidance system 32 associates a group of different levels of guidance for each corresponding task. Via a student terminal 20, a student is allowed to select one or more desired levels of guidance from the levels of available guidance. The student may be limited in access to certain guidance or given broad discretion in accessing different guidance levels according to the course developer's preferences or the instructor's preferences.

In accordance with a fifth technique, a guidance system 32 includes supporting a communications link to other student terminals 20 via the guidance system 32. The supported communications link may represent a real-time communications link, which allows synchronous interaction among students in the same course that are active on student terminals 20. Alternatively, the supporting of a communications link with other students may represent establishing an asynchronous communications link, such as an e-mail communications link between or among student terminals 20. In one example, the guidance system 32 may comprise a router or a telecommunications switch (external to the central data processor 14) for establishing circuit-switched or packetized communications.

In accordance with a sixth technique, similar to the fifth technique, for establishing a guidance system 32, the guidance system 32 may support a communications link among one or more students and one or more instructors. The communications link may include synchronous communications by establishing a real-time communications link or an asynchronous communications link by supporting e-mail communications, or otherwise.

Now that a method for developing an electronic course for instruction of students has been described in a general manner, a specific example of developing an electronic course is described in conjunction with FIG. 1 to further enhance an appreciation for the present invention. For example, in step S 10 in the context of a finance course as the electronic course, an illustrative scenario may provide a balance sheet for a hypothetical or actual company. Accordingly, the scenario data may comprise a textual or graphical depiction of a balance sheet.

In step S12, the central data processor 14 for the electronic course assigns roles to corresponding students. In one embodiment, the central data processor 14 automatically assigns roles to the students, where the roles were previously defined during the development of the particular course. In an alternate embodiment, an instructor may command the central data processor 14, via the instructor terminal 22, to select roles from a list and assign the roles to corresponding students. In another alternative embodiment, while taking the course, the students may select their corresponding roles from a predefined list or menu of roles via the interaction of the student terminal 20 with the central data processor 14. In the context of a financial course, students may be assigned a role of an accountant, an auditor, a chief financial officer, a chief executive officer or another appropriate role.

The task for a chief financial officer may include an analysis of the balance sheet to determine whether a particular business segment should be liquidated, sold, or retained. In such a case, in step S16 the guidance system 32 may include multimedia presentations from an instructor or an expert who has experience in evaluating acquisitions, mergers, or disposition of assets. Further, the guidance system 32 may permit a student to post a question for answer by other students or an instructor. The students may have the ability to look at questions from other students and responses to the other students by an instructor to enhance the learning experience.

In accordance with another example of executing the method of FIG. 1, in S10 the illustrative scenario may include a group of facts on different investment alternatives. In step S12, the role assignment may represent that of a financial analyst. In step S14, the task may be identifying the type of assets described in each of the potential investments pursuant to a cash flow diagram to illustrate cash flows for each asset identified. Alternatively, the task may include calculating the net present value of each of the different potential investments. Another task may include calculating an internal rate of return for each of the assets. Finally, the ultimate task may include determining which investments are viable and providing an answer in the form of a memo to a hypothetical supervisor on whether or not to invest in one or more of the potential investments.

Accordingly, in the context of the investment alternative scenario in step S16, the guidance system 32 may include one or more of the following tools: (1) a calculator for calculating net present value of an investment; (2) a calculator for calculating internal rate of return of an investment; (3) instructions for using a commercially available spread sheet program to determine the net present value and or the internal rate of return of an investment. The electronic tools 34 may provide a graphical representation of the net present value and or the internal rate of return as intermediate precursors to the ultimate task of whether or not to invest in a particular investment.

FIG. 3 shows a flow diagram of a method for developing an electronic course in accordance with the invention. FIG. 3 begins with step S22. Starting in step S22, a course developer organizes an electronic course into a group of modules of different subject matters related to a common topic of the course. Each module is associated with a corresponding course. Each module within the course may include a scenario, at least one role associated with the scenario, and at least one task associated with the scenario and the role. In practice, a module may include multiple scenarios and corresponding roles for the students. The scenario data, task data, and role data are stored in the course database 18. The course database 18 defines relationships between the modules, task data, role data, and course data to facilitate storage and retrieval of the foregoing data at appropriate times consistent with the presentation of the electronic course at student terminals 20.

The division of the course into the modules may be based upon the course objectives, the definition of tasks, or both. In one example, the boundaries between the different modules may be based upon necessary information to answer or solve a particular task. In another example, the modules may also be subdivided from a common topic based upon course objectives. In yet another example, all of the tasks affiliated with a module may be considered in determining the boundaries between different modules. The relationship between the task or group of tasks as a whole and the module may help to form natural breaks in the presentation of the electronic course. In still another example, the developer may discern the boundaries between different modules based on a template from at least one earlier course. The template from a previous course may facilitate the determination of a presentational format of a module for a subsequent course.

In step S24, a method for developing a course facilitates a reduction in the cycle time for the course development by supporting parallel development of course components, such as modules. A course component represents any portion or fraction of an entire course. A module of a course represents a course segment that supports the fulfillment of a course objective. The parallel development of course components may be extended to parallel development of courses to further reduce the development time for an entire curriculum or suite of electronic courses. Thus, course development method of the invention supports rapid development of an entire curriculum of courses, which may cover a gamut of topics.

In step S24, one or more course developers simultaneously develop at least two of the modules for the course. The course developers preferably include different teams of course developers that simultaneously work on different modules for the same course. Each team of course developers may develop one or more modules. Each team may use a distinct development tool 28 to optimize the data processing resources available. The modules (developed from the different groups) are aggregated and, if necessary, harmonized for compatibility as an integral, functional, electronic course.

The subject matter of the modules is preferably sufficiently independent to facilitate the simultaneous development of at least two different modules for the course. Further, the independence of the modules for an electronic course tends to minimize any requirement for subsequent harmonization processing. Because multiple teams may simultaneously develop modules for the course, the cycle time for a course development may be reduced considerably from a traditional serial approach to developing course materials, such as a textbook. For instance, a textbook is frequently written by an author in a linear, serial fashion.

Moreover, the electronic course may be released to students and made accessible to students of the electronic course prior to completion of the entire electronic course, as long as at least one module of the electronic course is complete. The course development method facilitates a reduction of the course development cycle because the electronic course can even be delivered to students prior to its completion and during its development. Such an approach contrasts from deployment of a traditional textbook which may require elaborate advance notice for mass printing, publishing and distribution. The distribution of textbooks typically requires the potentially length procedures of ordering, shipment, and sales of complete textbooks by retailers on or near university campuses.

After step S24 in step S26, the developers conduct one or more tests of at least one of the developed modules of an electronic course. The testing procedure may include testing an electronic course during different phases of the development of the electronic course. The format of the electronic course preferably varies with each of the phases of development. If a portion of a course is released for the limited purpose of testing with students, the course may be improved based on actual feedback from the students.

During a first phase, the electronic course is expressed in a first format that does not involve customized programming instructions for display on a computer, such as a student terminal 20. For example, the first format may include a printed representation of the course. Further, the first format may include audio recordings, video recordings, or other media that are in a standard format for playing by commercially available equipment (e.g., a video cassette recorder or digital video disk player).

During a second phase, the electronic course is expressed as a second version, which is a complete version that operates in cooperation with a central data processor 14, a communications network 12 and one or more student terminals 20. The second phase is particularly appropriate for testing the functionality of the programming instructions and communications features that underlie the presentation of the electronic course to students. During any of the foregoing three phases, the test subjects may review the electronic course for content, comprehension, or other deficiencies.

One or more of the test phases of the test contribute to the formation of a final or revised version of the electronic course that provides reliable and accurate instructions to student terminals 20 in a manner that is tailored to student's comprehension of the subject matter. Accordingly, a proper precursor to the testing phases is selection of test subjects. Each test subject is preferably representative of students or prospective students of the course in educational background, work experience, standardized test scores, grade point average, or other factors. The test subjects review the electronic presentation or other presentations of at least one of the developed modules on behalf of the developers. Multiple groups of test subjects may be used to simultaneously test different modules of the electronic course to facilitate reduction in the development time for the course. The test subjects provide feedback on the presentation of the course. The course developer may facilitate real-time feedback of the test subjects to achieve a more accurate depiction of the test subject's evaluation of the presentation of the developed modules.

Following step S26 in step S28, if necessary or appropriate, the developer revises the electronic course based on feedback from the test subject or subjects. The revision of the electronic course after one or more of the aforementioned testing phases may be necessary or appropriate where the test subject identifies ambiguities in the presentation, inaccuracies in the presentation, spelling mistakes, or grammar mistakes or otherwise identifies areas of weakness in the presentation that cause confusion. The revised electronic course preferably supports greater comprehension of students at a level of learning that is appropriate for the students, rather than a theoretical or abstract level which may be provided by an instructor with considerable expertise in a particular subject matter.

Figure 4:
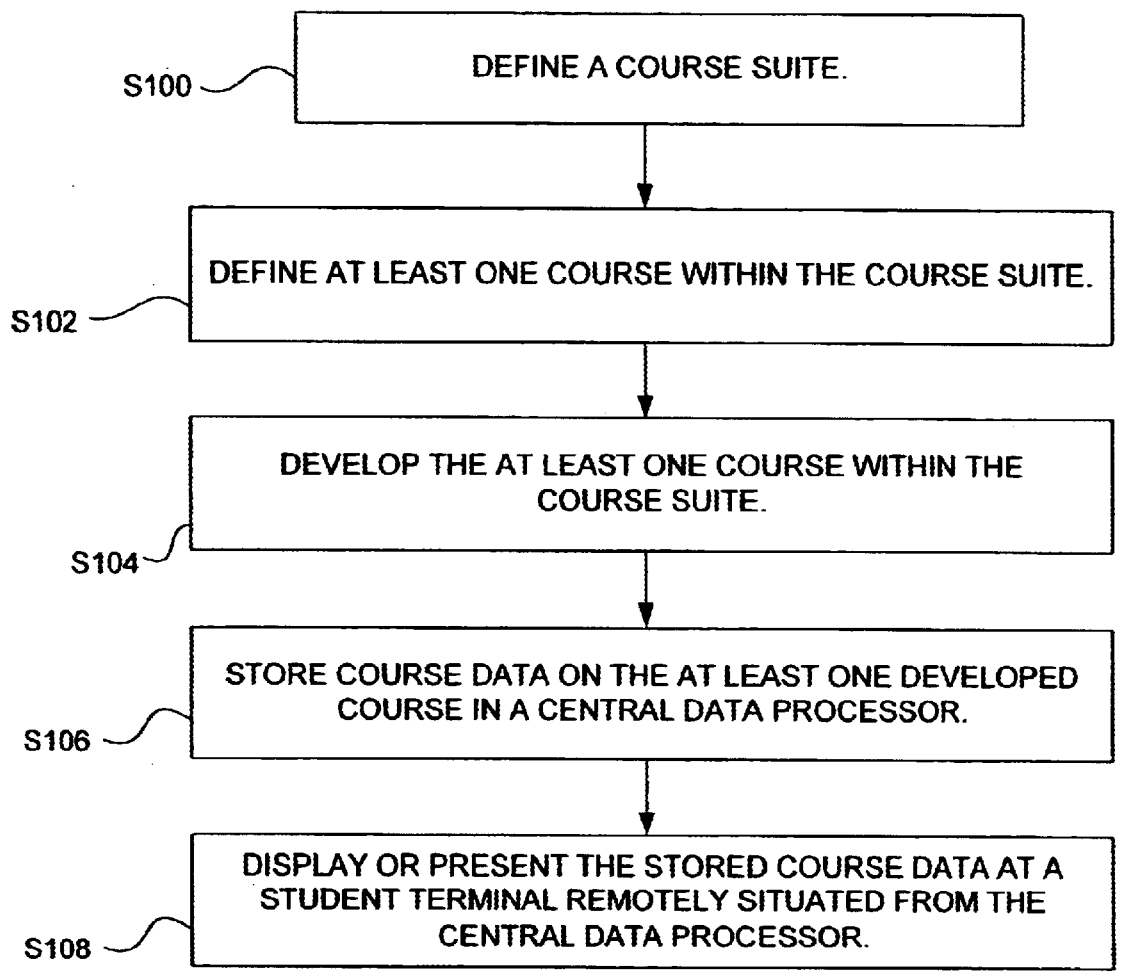
FIG. 4 is a flow diagram of a procedure for developing a course within a course suite in accordance with the invention.

The method of FIG. 2 or FIG. 3 may be applied to steps S102, step S104, or both in the method of FIG. 4. FIG. 2 and FIG. 3 focus on course development, whereas FIG. 4 through FIG. 7 focus on course development within the context of a course suite. The order of presentation of FIG. 2 through FIG. 7 does not represent a limit to the possible order of execution of the course development method in accordance with the invention. Accordingly, the course development procedure of the invention may begin with developing a course (e.g., in FIG. 2) or developing a course suite (e.g., FIG. 4). FIG. 4 is a flow diagram which illustrates the development of at least one course within a course suite in accordance with one embodiment of the invention.

In step S100 of FIG. 4, a course suite is defined. A course suite has a content component and a temporal component. The content component addresses the general subject matter of the course suite and topics falling under or related to the general subject matter. The developer may define the content component of the course suite based on a comparable or equivalent university course. The content component of the course suite may be defined in terms of the learning objectives and an outline of content for the course suite.

The temporal component may be defined as the equivalent of certain minimum range of credit hours of a university course. The course suite is composed of a group of courses which require some minimum numbers of hours of student effort (e.g., 20–25 hours of student effort). For example, a course suite may include from three to six courses, although other numbers of courses per course suite fall within the scope of the invention.

In another embodiment, the temporal component may be defined as the time allotted for a student to complete tasks of a course and progress through the completion of one or more scenarios of the course.

In step S100, the developer may define a course suite in accordance with the following exemplary procedure, which includes two fundamental stages. During a first fundamental stage of step S100, the developer establishes the design of the course suite as follows: Initially, the developer identifies learning objectives for the course suite. The developer forms an organizational structure for a course suite based on the identified learning objectives. The developer incorporates strategic elements into the organizational structure. The design of the course suite includes a student-interaction model that considers presentation of the electronic course based on the organizational structure and the strategic elements.

During a second fundamental stage of step S100, the developer defines an electronic learning environment, such as a problem-based learning environment. The developer prepares fact scenarios consistent with the learning objectives and the organizational structure of the course suite. The developer maps relationships among courses within the course suite. Further, the developer may map relationships between scenario identifiers and course identifiers.

After step S100 in step S102, the developer defines at least one course within the course suite. The developer determines a course specification consistent with the established learning objectives and the organizational structure for the course suite. The course specification may include establishing one or more scenarios associated with a corresponding course. The developer defines a proposed media treatment for the course. In one example, at least one fact scenario is included per module within a course. The developer or its agent assess the technical feasibility for the proposed media treatment. The proposed media treatment may be altered as necessary to conform to technical constraints. For example, the proposed media treatment may be altered to a revised media treatment to be transmitted in a timely fashion over the available bandwidth between the central data processor 14 and a student terminal 20.

In step S104, the developer develops a course within the course suite. The development of the course suite includes designing specific elements of a course component. A course component represents any portion of an entire course. A course component may or may not be commensurate in scope with a feature of the course. The developer builds a greater-resource element prior to a lesser-resource element of the course to reduce the development cycle time for developing a course.

A greater-resource element generally occupies a greater storage size (e.g., bytes in the storage device 16) than a lesser-resource element. For example, a greater-resource element may comprise a multimedia or audio-visual element, whereas a lesser-resource element may comprise a textual, audio or graphical element. The greater-resource element may have a longer development lead time and a greater complexity than a lesser-resource element. The developer simultaneously assembles one or more greater-resource elements and one or more lesser-resource elements into a course component of the course.

The developer may form a course from a plurality of course components. The developer may test the course components on a component-by-component basis. Subsequently, the entire course may be tested as a cohesive unit of multiple course components. The testing may be conducted on a non-electronic form (e.g., printed form) of the course or an electronic form of the course. Final testing is conducted on an electronic version of the course over a communications network 12 by test subjects representative of students of the course. The course data may be updated, as necessary or appropriate, based on the testing or developments in the underlying course content.

In step S106, the course data on at least one developed course is stored by a central data processor 14 for release of the electronic course to registered students at student terminals 20. Although course data for the courses of an entire course suite may be stored by the central data processor 14, a partially complete course suite may be stored on the central data processor 14 to reduce the development cycle time for course suite creation. Accordingly, the developer may add additional courses to a partially complete course suite (loaded on the central data processor 14) even as students at student terminals 20 work on another course within the partially complete course suite.

In step S108, the stored course data is displayed or presented to one or more student terminals 20. The student terminals 20 may be remotely situated from the central data processor 14. The course data may be displayed by an instructor terminal 22 in addition to the student terminals 20. The display includes a representation of reference data 30.

Figure 5:
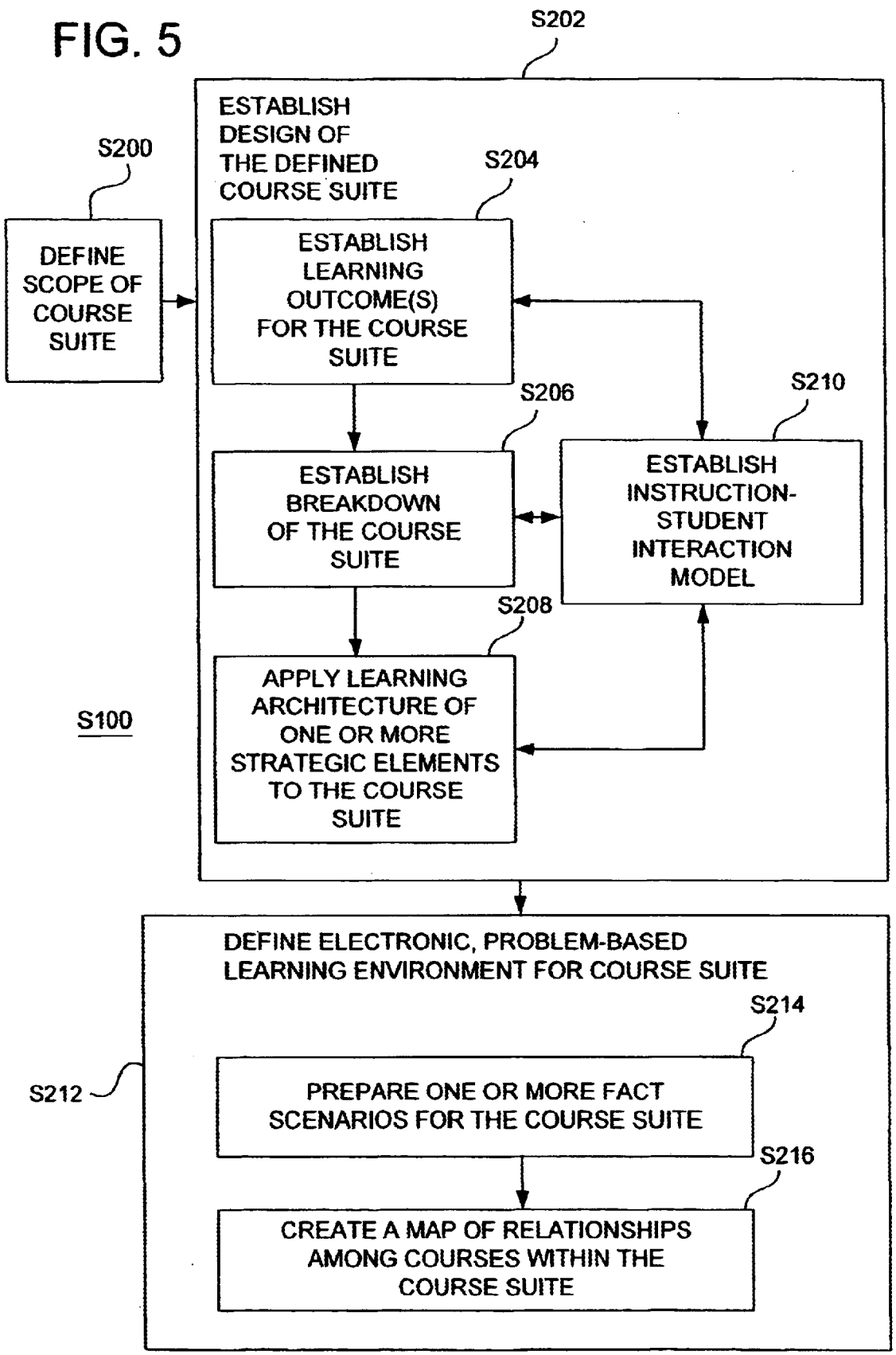
FIG. 5 is a flow diagram which shows the step of defining a course suite of FIG. 4 in greater detail.

FIG. 5 is a flow diagram that shows step S100 of FIG. 4 in greater detail. Starting in step S200, the developer defines the scope of the course suite. The course suite identifies the constituent courses within the course suite. The scope of the course suite includes a range of subject matter of the contents of the course suite. In one embodiment, the developer may define the subject matter contents of the course suite scope based upon one or more of the following sources of information: a survey of students or potential students, demographic research on students or potential students, an instructor, course readings of a comparable course at another institution, a course description from a university course catalog, a document written by an instructor, and a syllabus of a comparable course.

The definition of the course suite scope may contain an affirmative definition of what components the course suite contains. In addition, the definition of course scope may include major components that are not included in the course suite. Thus, the course definition supports a negative definitional component as well as a positive definitional component of the subject matter included in the scope of the course suite.

In step S202, the conceptual design is established for the course suite after defining the course suite scope in step S200. The establishing of the conceptual design step S202 includes various constituent steps which may be executed simultaneously or in any order. As shown in FIG. 5, the constituent steps include steps S204, S206, S208 and S210, which may be executed iteratively.

In step S204, the developer establishes at least one learning outcome for a course suite. The learning outcome refers to the expression of an achievable goal of the course or an objective of the course. In step S206, the developer establishes an organizational structure for a course suite. The organizational structure represents a course breakdown. The course breakdown may comprise an outline of course topics that track corresponding learning outcomes. In step S208, the developer applies a learning architecture to the established course breakdown and the established course suite learning outcomes. In step S210, the developer establishes instructions and/or a student-instruction interaction model consistent with the established learning outcome, the established organizational structure, and the applied learning structure.

The learning outcomes established in step S204 provide a general guide or foundation for designing the course suite in subsequent steps following step S204. The learning outcome may include knowledge outcomes and attitudinal outcomes for the course suite or a course. Knowledge learning outcomes address the issue of what a typical student should know or knows how to do after the student has taken the course suite or course. The attitudinal learning outcomes may address shifts in attitudes or misconceptions of a typical student after completing the course suite or a course. Thus, the learning outcomes may include teaching a student new skills or correcting deficiencies or preconceived problems in existing skills. In a preferred embodiment, the knowledge outcomes and the attitudinal outcomes are related to real-world problems, rather than abstract or theoretical problems. Thus, the student may appreciate the importance of the knowledge which is expressed as the learning outcome.

In step S206, the developer establishes an organizational structure (e.g., a course suite breakdown) consistent with the defined scope of course suite content of step S200 and an initial expression of the learning outcomes of step S204. The organizational structure is a framework that divides the course suite into its constituent courses. For example, the organizational structure may specify how a typical course from a university, for example, may be divided into courses within the course suite.

The established organizational structure may include the association of learning outcomes with corresponding courses. The established organizational structure may include possible scenarios and media objects for illustrating concepts relevant to identified learning outcomes. The organizational structure may identify any dependencies between other courses within a course suite such that courses are provided within a preferential order within the course suite.

In one embodiment, the developer may develop a group of alternatives of organizational structures and select the best organizational structure from the group. At a minimum, the best organizational structure is a course suite breakdown that satisfies the presented learning outcomes. Hence, the selection of learning outcomes that are related to real-world applications or problems and the expression of the learning outcome may represent a fundamental aspect of selecting a proper organizational structure.

In step S208, the developer applies a learning architecture of software-related elements to the established organizational structure. The learning architecture addresses a manner of the organization of an electronic course and the presentation of an electronic course. The learning architecture includes one or more of the following learning elements: an audience strategic element, content strategic element, motivational strategic element, feedback strategic element, reflection strategic element, supportive strategic element, informational strategic element, and any other strategic element consistent with a problem-based learning focus. One or more of the foregoing learning elements of learning architecture are incorporated into the course data, reference data 30, or software instructions associated with the course data, consistent with the organizational structure of an individual course or a course suite.

An audience strategic element refers to a learning element that may support or compensate for a particular classification of students to facilitate learning among different types of students of an electronic course. Students may differ in their subject matter strengths, cultural background, language skills, and attitude, for example. For example, an audience strategic element may include a reference glossary of equivalent terms in English and a foreign language for foreign students.

A content strategic element refers to selection of a subject matter or reference data 30 for inclusion in a course based upon a given learning outcome for the course suite.

A motivational strategic element refers to a procedure or organizational structure of a course that tends to motivate students to take the course or to participate in the course. For example, the selection of reading assignments and tasks affiliated with the course, the complexity of the content, and assigned roles for a scenario may affect the motivation of the students. The role assignment and task related to a specific scenario tends to foster motivation of the students. In practice, the feedback strategic element may be implemented by the communications interface 36 that is accessible from the electronic course.

A feedback strategic element involves a mechanism for the student to receive a response with respect to the student's performance after the performance of a task or at other times during each course or course suite.

A reflection strategic element is a particular feedback mechanism or organizational structure of a course for building confidence in the student's use of the knowledge gained in each course. For example, the feedback mechanism may use repetition and variation of concepts taught in the course in response to student input to strengthen the student's comprehension and confidence with the subject matter of the course.

A supportive strategic element concerns a support mechanism, electronic tool 34, or reference data 30, that the course provides to the student to prevent the student from getting confused or being confused. A supportive strategic element may involve providing a forum for electronic communications and the exchange of ideas among the instructor and fellow students.

The informational strategic element is a software component that organizes or indexes the material in the course suite so that the student can readily access the material. For example, an information strategic element may sort course material for a key word or Boolean logic search. Further, the information strategic element may enable a student to search or sort a list of messages from other students in an electronic course to foster discussion and cooperation among students.

In step S210, the developer establishes an instruction-student interaction model. The developer may base the establishment of instruction-student interaction model on the learning architecture of step S208, the organizational structure of step S206, the learning outcomes of step S204, or any combination of the foregoing. The student interaction model supports interaction of one or more students with an electronic course or components thereof. Accordingly, the student interaction model may identify preliminary key media components for the course or course suite. The media components are preferably capable of being delivered to a student terminal 20 upon request in a timely fashion (e.g., a real-time response).

The student interaction model may facilitate communications between students in the same course, the same course suite, or both. Similarly, the student interaction model may facilitate communications between one or more students and the instructor of a course.

In step S212 following step S202, or constituent step S210, the developer defines an electronic learning environment associated with the electronic course suite. Step S212 includes the constituent steps (S214, S216) of preparing a scenario for a course suite and creating a map for a course suite. In step S214, the developer generates scenarios associated with corresponding learning objectives. The scenarios represent case studies of actual or hypothetical situations.

In step S216, the developer creates a course map for the courses within the course suite. The course map created in step S216 shows the fundamental relationships among courses or course components within the course suite. For example, the course map may provide an order for student completion of tasks, as course components, within a given course.

Figure 6:
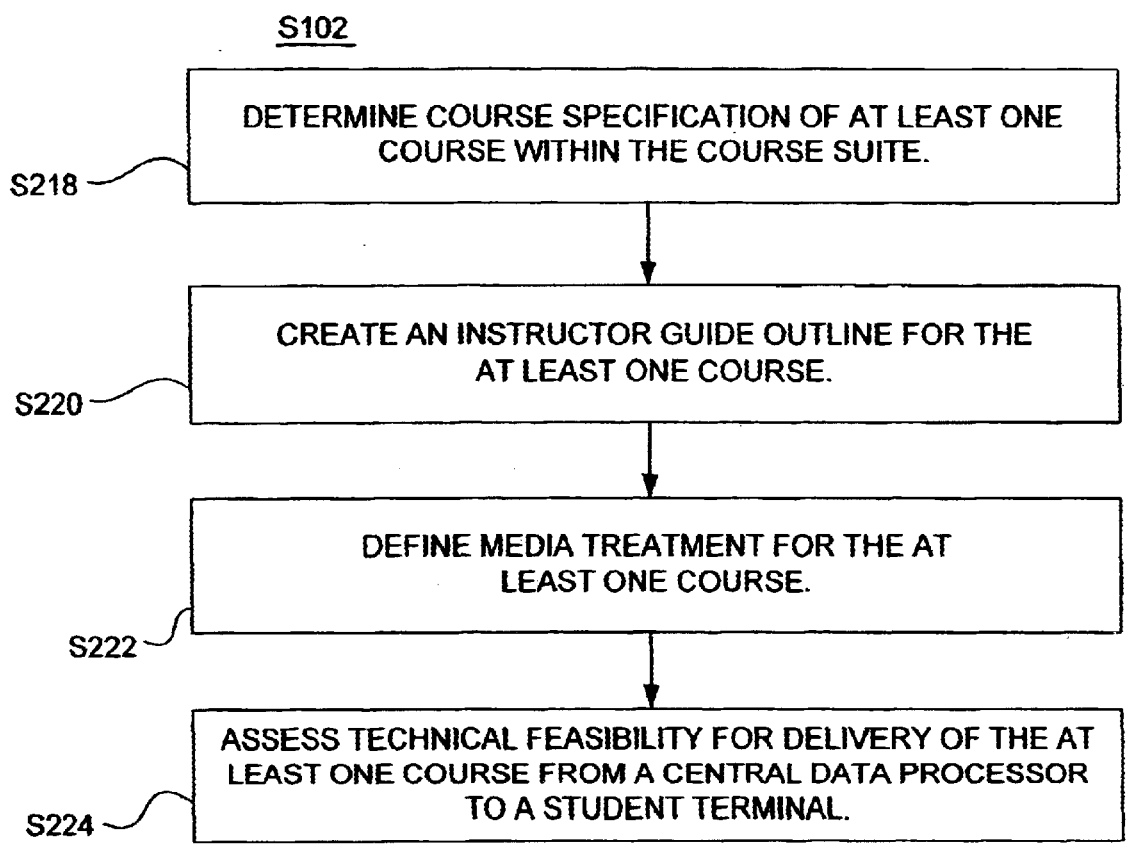
FIG. 6 is a flow diagram which shows the step of defining a course of FIG. 4 in greater detail.

FIG. 6 shows a flow diagram of planning at least one course within the suite of courses. FIG. 6 shows step S102 of FIG. 4 in greater detail. Starting in step S218, the developer determines a course specification of at least one course within a course suite. The determination of the course specification includes specifying the modules of a course, the course components of the course, the elements of the components.

The course may be defined in a manner consistent with the following hierarchical organization structure of a course. Each course may be divided into modules. The modules may track the learning outcomes, scenarios, or both. A module may contain course components, elements, learning elements, reference data 30, and course data that is applicable for a presentation of an interactive electronic course. A course component refers to any portion or segment of a course. A course component may have, but does not need to have, a commensurate scope with a feature of the course. Features of the course include tasks, activities, reading materials, tutorials, scenarios, or other aspects of the course. An element is a subset or subcomponent of a course component. Course elements, such as learning elements, may be necessary to realize a course component. Reference data 30 supports course components. Reference data 30 includes textual data, media objects, electronic tool data, audio data, multimedia data, audiovisual data, or the like. Reference data 30 is a subset of course data, which includes any data used to support the electronic course.

The course specification of different courses within the same suite may be reviewed to assure that the coverage of a particular course does not overlap with another course in an unintended manner.

Following the finalization of the course specification, in step S220 a developer may create an instructor guide or an outline of an instructor guide. The instructor guide provides details on instructor interaction with one or more students and information on the instructor's ability to control constituent components of a particular course within a course suite. The creation of the instructor guide is optional and step S220 may be deleted.

In step S222, a developer may define media treatment for at least one course. Accordingly, the developer may establish a list of major media elements (e.g., objects) consistent with the course specification of step S218. Because high-resource media elements may require longer production times than textual, or other low-resource elements of a course or a course suite, the high-resource media elements may be placed into a media production pipeline at an earliest possible time after the course suite definition and the course specification.

After defining the course media treatment the developer may assess the feasibility of one or more courses within the course suite in steps S224. The feasibility assessment may include a technological assessment of potential technical problems of transmission of the electronic course or the course suite over the communications network 12. For example, the transmission of certain media elements may be troublesome where bandwidth or communications resources are limited between students and the central data processor 14.

In step S224, the developer considers the technical resources necessary to support the specific learning outcomes and identified fact scenarios of each course within the course suite. In general, technical resources include the processing capability of the student terminals 20 and the central data processor 14 and the communications capacity of the communications network 12 between the student terminals 20 and the central data processor 14. The technical resources are used to convey reference data 30, associated with the central data processor 14, to the student terminals 20. Further, technical resources of the student terminals 20 facilitate display or presentation of the reference data 30 at the student terminals 20.

Reference data 30 is explanatory data or presentational data that is appropriate or necessary for explaining a component of the course. Reference data 30 may include media elements for communication, data supportive of interaction between students, and data supportive of interaction between one or more students and an instructor. The development tool 28 may be used to originate reference data 30 or organize reference data 30 for the central data processor 14.

The development tool 28 may include a selector 31 for selecting a group of preferential reference data 30 for inclusion in the electronic course. The development tool 28 facilitates the selection of preferential reference data 30 that than can be technically supported by at least the student terminal 20, the communications network 12, and the central data processor 14. For example, the development tool 28 may select preferential reference data 30 with a supported data structure (e.g., asynchronous transfer mode data packets) that is supported by the public telephone network 24 and the communications service provider system 26.

The selector 31 may assign a technical cost to a proposed reference data 30 element of the electronic course. The selector 31 may include a technical budget limit for the aggregate of all of the proposed reference data 30 elements that comprise the electronic course. The technical budget limit depends upon the applicable technical resources (e.g., transmission capacity between the central data processor 14 and the student terminals 20). The developer can compare the relative technical costs of different proposed elements to determine the preferential reference data 30 or the associated features of the electronic course. Where alternative reference data 30 elements fall within the technical budget, the developer consults with an instructor, an expert, or takes surveys of test subjects representative of prospective students to determine which course components (and underlying preferential reference data 30) to select to meet the technical budget.

In an alternate embodiment, a technical consultant may establish the technical feasibility of the proposed reference data 30 elements of the electronic course.

Figure 7:
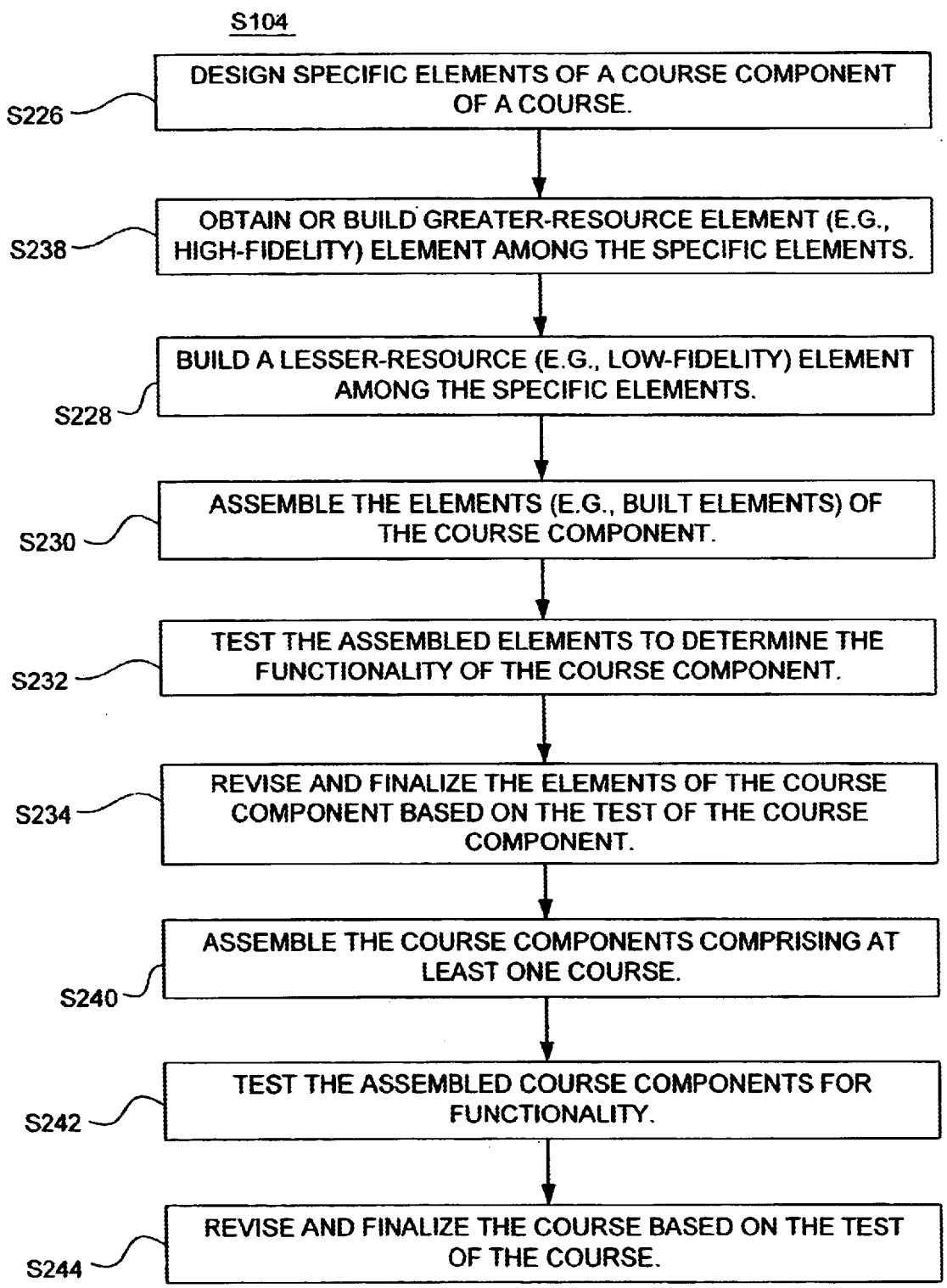
FIG. 7 is a flow diagram which shows the step of developing one or more courses of FIG. 4 in greater detail.

FIG. 7 shows step S104 of FIG. 4 in greater detail. Starting at step S226, the developer designs specific elements of a course component of a course. A course component may include a task, activity, module, reading instructional material, media element or the like.

Initially, a media element may be modeled as a lesser-resource (e.g., low-fidelity) element without interactive functionality to conserve course development resources and to reduce cycle time for course development. For example, test subjects, an instructor, or both may evaluate a lesser-resource media object in a printed form prior to designing a full-blown media element with full interactive functionality. A lesser-resource media element may lack interactive functionality and includes printed facsimiles of higher-resource media elements, such as multimedia presentations.

After step S226 in step S238, a developer obtains, builds, or begins construction of a greater-resource (e.g., high-fidelity) element for the course. The greater-resource element may require a greater time for completing construction of the greater-resource element, as opposed to a lesser-resource element.

In step S228, a developer builds a lesser-resource element of the course. The lesser-resource elements of the course may comprise a printed expression of an element of the course, as opposed to an electronic expression of an element of the course. The lesser-resource elements may lack animation and various interactive components, but may resemble certain aspects of the final rendering in of the course in electronic form. During step S228, the construction of the greater-resource element, which began in step S238, may continue.

Prior to step S230, the construction of the greater-resource element and the lesser-resource element are completed. The completion of the greater-resource element and the lesser-resource element may be substantially simultaneous owing to the earlier starting time for the construction of the greater-resource element with its associated longer lead time and the later starting time for the construction of the lesser-resource element with its associated shorter lead time.

In step S230, one or more lesser-resource elements and one or more greater-resource elements are assembled into the course component designed in step S226.

In step S232, the developer conducts an element-by-element test of the assembled elements assembled in step S230 to evaluate the functionality of the course component. Alternatively or additionally, the developer conducts a test of the assembled course component as a cohesive unit to evaluate the functionality of the course component.

In step S234, revisions are made to the course materials based on feedback from the test of the course elements, the course component, or both during at step S230. Based on the conducted test, the elements may be revised in an editorial manner starting in step S226 and continuing to any of the following steps: S228, S230, and S238. Retesting may be conducted to validate such revisions to the elements.

Steps S226 through S234 may be repeated for each course component of the course, although as illustrated in FIG. 7 only a single execution is shown. After revision and finalizing the components in step S234, in step S240 the developer assembles the course components to a cohesive course within the course suite. The assembly of the course components represents a placement of the course into an electronic format or another format representative of the course that is suitable for testing.

In step S242, the course components are tested on a component-by-component basis or the whole integrated course is tested for functionality. Test subjects representative of students test the course components to determine if the course components properly cooperate and work with one another. The test may test the functionality in the electronic mode as well as the content of the course in a non-electronic mode.

In step S244, the course or course suite is revised in accordance with the feedback or other issues uncovered during the component-by-component test or the integrated course test during step S242. Following step S244, the course or course suite may be ready for pilot testing. The pilot testing may be conducted over an electronic communications network 12, whereas the complete integration test of the course components in step S242 may not be conducted over a communications network 12. Thus, the pilot test represents a test under actual or simulated operating conditions of the course or course suite. Following step S244, the method may continue with steps S106 and S108 as previously described in conjunction with FIG. 4.

The foregoing description of the method and system for developing an electronic course provides several illustrative examples of the invention. Modifications, alternative arrangements, and variations of these illustrative examples are possible and may fall within the scope of the invention. Accordingly, the following claims should be accorded the reasonably broadest interpretation which is consistent with the specification disclosed herein and not unduly limited by aspects of the preferred embodiments disclosed herein.

We claim:

1. A method for providing an electronic course for instruction of students via an electronic communication network, the method comprissing the step of:
   describing an illustrative scenario for an electronically deliverable course;
   defining at least one possible role assignment for a corresponding student of the course based on the illustrative scenario;
   providing a task for the student based on the role assignment and the scenario; and
   establishing a guidance system accessible to the student over the electronic communications network to provide guidance for solving the task, wherein the guidance system comprises providing a list of electronic tools to the student, the electronic tools being associated with a corresponding scenario, wherein the electronic tools comprise a calculator for determining an intermediate result or precursor to the solution of the task.

2. The method according to claim 1 wherein the establishing step comprises tailoring the level of guidance to the student based on an assigned level of the student.

3. The method according to claim 1 wherein the establishing step comprises tailoring the level of guidance to the student based on an assigned level of the student from previous feedback from an instruction during the course.

4. The method according to claim 1 wherein the establishing step comprises developing a hint on solving a task as a lowest level of guidance.

5. The method according to claim 1 wherein the establishing step comprises developing a specific direction on solving a task as a highest level of guidance.

6. A method for providing an electronic course for instruction of students via an electronic communications network, the method comprising the steps of:
   describing an illustrative scenario for an electronically deliverable course;
   defining at least one possible role assignment for a corresponding student of the course based on the illustrative scenario;
   providing a task for the student based on the role assignment and the scenario; and
   establishing a guidance system accessible to the student over the electronic communications network to provide guidance for solving the task, wherein the establishing step comprises tailoring the level of guidence to the student base on an assigned level of the student.

7. The method according to claim 6 wherein tailoring the level of guidance to the student further comprises tailoring the level of guidance to the student based on an assigned level of the student from previous feedback from an instructor during the course.

8. The method according to claim 6 wherein the establishing step further comprises developing a hint on solving a task as a lowest level of guidance.

9. The method according to claim 6 wherein the establishing step further comprises developing a specific direction on solving a task as a highest level of guidance.

10. The method according to claim 6 wherein the establishing step further comprises establishing an electronic library of presentations associated with the task, the electronic library being accessible via the electronic communications network.

11. The method according to claim 10 wherein the presentations are selected from the group consisting of an audio presentation, a visual presentation, and multimedia presentation.

12. The method according to claim 6 wherein the establishing step further comprises supporting a real-time communications link to other students as the guidance system.

13. The method according to claim 6 wherein the establishing step further comprises supporting an e-mail communications link to other students as the guidance system.

14. The method according to claim 6 wherein the establishing step further comprises supporting a communications link to an instructor as the guidance system.

15. A method for providing an electronic course for instruction of students via an electronic communications network, the method comprising the steps of:
   describing an illustrative scenario for an electronically deliverable course;
   defining at least one possible role assignment for a corresponding student of the course based on the illustrative scenario;
   providing a task for the student based on the role assignment and the scenario; and
   establishing a guidance system accessible to the student over the electronic communications network to provide guidance for solving the task, wherein the establishing step comprises developing a hint on solving a task as a lowest level of guidance.

16. The method according to claim 15 wherein the establishing step further comprises developing a specific direction on solving a task as a highest level of guidance.

17. The method according to claim 15 wherein the establishing step further comprises establishing an electronic library of presentations associated with the task, the electronic library being accessible via the electronic communications network.

18. The method according to claim 17 wherein the presentations are selected from the group consisting of an audio presentation, a visual presentation, and multimedia presentation.

19. The method according to claim 15 wherein the establishing step further comprises supporting a real-time communications link to other students as the guidance system.

20. The method according to claim 15 wherein the establishing step further comprises supporting an e-mail communications link to other students as the guidance system.

21. The method according to claim 15 wherein the establishing step further comprises supporting a communications link to an instructor as the guidance system.

22. A method for providing an electronic course for instruction of students via an electronic communications network, the method comprising the steps of:

describing an illustrative scenario for an electronically deliverable course;

defining at least one possible role assignment for a corresponding student of the course based on the illustrative scenario;

providing a task for the student based on the role assignment and the scenario; and establishing a guidance system accessible to the student over the electronic communications network to provide guidance for solving the task, wherein the establishing step comprises associating a group of different levels of guidance for a task and allowing a student to select one or more desired levels of guidance from the levels of available guidance.

23. The method according to claim 22 wherein the establishing step further comprises supporting a real-time communications link to other students as the guidance system.

24. The method according to claim 22 wherein the establishing step further comprises supporting an e-mail communications link to other students as the guidance system.

25. The method according to claim 22 wherein the establishing step further comprises supporting a communications link to an instructor as the guidance system.

* * * * *

UNITED STATES PATENT AND TRADEMARK OFFICE
CERTIFICATE OF CORRECTION

PATENT NO. : 6,622,003 B1
DATED : September 16, 2003
INVENTOR(S) : Elizabeth Denious et al.

It is certified that error appears in the above-identified patent and that said Letters Patent is hereby corrected as shown below:

<u>Title page,</u>
Item [56], References Cited, OTHER PUBLICATIONS, "Website Entitled Brevard Community College Online" reference, immediately before "Brevard" insert -- " -- (opening quotes) and immediately after "with BCC," insert -- " -- (closing quotes).

<u>Column 7,</u>
Line 48, delete "communication" and substitute -- communications -- in its place.
Line 49, delete "comprissing the step" and substitute -- comprising the steps -- in its place.

Signed and Sealed this

Twenty-eighth Day of December, 2004

JON W. DUDAS
*Director of the United States Patent and Trademark Office*